June 7, 1949.  H. G. VOLIS  2,472,554
EXPANSIBLE REAMER
Filed March 20, 1946
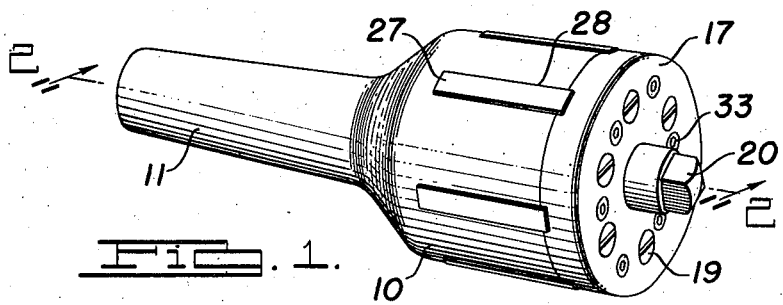
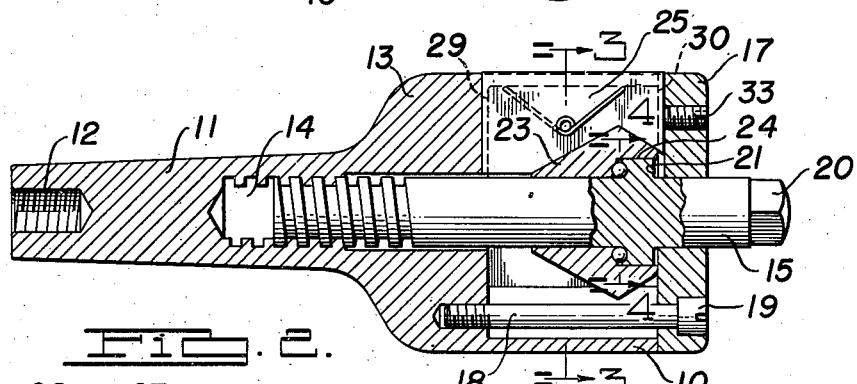
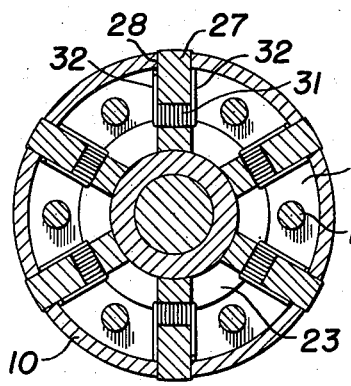
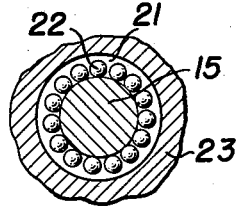
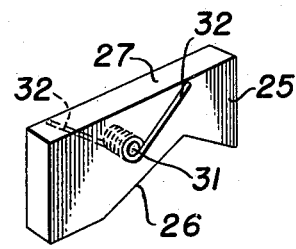
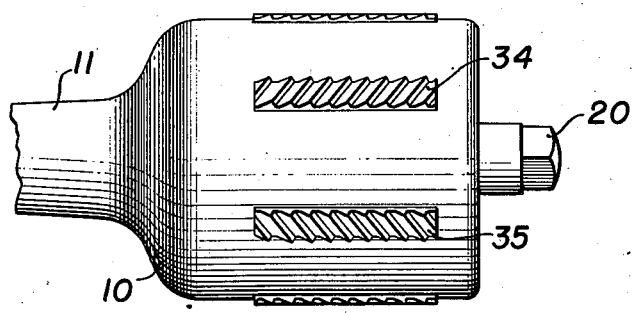
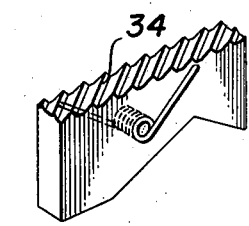
INVENTOR.
Harry G. Volis
BY Louis Chayka
ATTORNEY Patented June 7, 1949

2,472,554

UNITED STATES PATENT OFFICE 2,472,554

EXPANSIBLE REAMER

Harry G. Volis, Detroit, Mich.

Application March 20, 1946, Serial No. 655,867

2 Claims. (Cl. 77—76)

1

The purpose of my invention is to provide an improved tool which may serve as a reamer but in which members included therein and adapted to be forced outwardly therefrom may be removed and substituted by cutting elements to convert the device into an efficient reamer.

While my description will be initially directed to a mandrel, it will be understood that said description will be applicable to my tool when used as a reamer.

I shall now describe my improvement with reference to the accompanying drawings, in which:

Fig. 1 is a perspective view of my mandrel;

Fig. 2 is an axial sectional view on line 2—2 of Fig. 1;

Fig. 3 is a sectional view of the mandrel taken on line 3—3 of Fig. 2;

Fig. 4 is a sectional view of the axial region of the mandrel on line 4—4 of Fig. 2;

Fig. 5 is a perspective view of a radial fin, being a part of my mandrel;

Fig. 6 is a side elevation of my mandrel converted into a reamer;

Fig. 7 is a perspective view of a reamer blade, being a part of the reamer shown in Fig 6.

Similar numerals refer to similar parts throughout the several views.

The mandrel includes a drum-shaped body, called herein a drum 10, provided with an integrally connected shank 11, axially extending therefrom and threaded inwardly at 12. The part of the drum which adjoins the shank is solid but contains an axial bore 14 threaded for engagement of a shaft 15. The remaining part of the drum is hollow, forming a chamber 16. The chamber is provided with an end closure 17, which is held in place by means of bolts 18 threaded at their inner ends into the solid portion 13 of drum 10. The bolts are disposed in the marginal portion of closure 17, as best shown in Fig. 1, wherein the heads of the bolts are indicated by numeral 19. The above mentioned shaft 15, the inner end of which is threaded into the solid portion of drum 10, extends through chamber 16, is journalled in the end closure 17 and terminates outwardly thereof in an angular butt 20 for application of a wrench.

An annular shoulder 21 on the shaft within the chamber 16 has a double purpose. It acts as a stop limiting the longitudinal movement of the shaft outwardly of drum 10, while the face of the shoulder on the side remote from end closure 17 contains a race for balls 22. Seated upon said shaft in an axial arrangement therewith is a cone 23, having a circular socket 24 on the

2 side facing closure 17 for reception of shoulder 21, while balls 22 serve as a means of reducing friction between said shoulder and the respective part of the cone.

Radially arranged with respect to said cone, and slidingly abutting its surface, are a number of fins 25. A single fin, as shown in Fig. 5, is a flat member having a sloping underside 26, to correspond to the inclination of the outside surface of cone 23 and having a level upper edge 27. The wall of chamber 16 is provided with a separate slot 28 for each fin, said slots permitting the fins to be shifted outwardly of the drum. To guide the movement of the fins, a groove 29 is cut in the solid portion 13 of the drum 10, while the corresponding grooves 30 are cut in end closure 17.

Normally, the fins are contained within the drum, the outer edges of the fins being flush with the outer surface of the drum, as shown in Fig. 1. Each of the fins is held in position by tension of a coiled spring 31, located in a transverse aperture in the body of the fin and having oppositely set free arms 32 yieldingly bearing against the inner surface of chamber 16, so as to straddle slot 28 as best shown in Fig. 3. By way of a refinement, I am including adjusting screws 33 which, passing through closure 17, prevent any end play of the respective fins 25 within grooves 29 and 30.

The operation of the mandrel appears quite obvious. Assuming that the mandrel is in place in a lathe in a position to support an object to be worked upon, said object may be secured in place upon the mandrel by having the fins extend outwardly into a frictional contact with the inner surface of said object. In order to shift the fins outwardly, shaft 15 is rotated to propel it inwardly in the direction of shank 11. As a result thereof, cone 23 will be moved in the same direction, and as said cone bears against the lower edges of fins 25 from inwardly, it will force them outwardly against tension of springs 31. In view of the fact that the drum is hollow and spacious, the extent to which the fins may be forced out is quite considerable, thus broadening the limits of usefulness of my mandrel.

As above stated, the mandrel may be easily converted into a reamer. This is shown in Figs. 5 and 6, where reamer blades 33 take place of fins 25 employed in my mandrel. The blades have serrated cutting edges 34 and 35 respectively, the edges varying alternately with respect to the angle of cutting to secure a smooth surface on the object worked upon.

It will be seen that some changes may be made in the construction of my improved mandrel without departing from the inventive principle disclosed herein. What I, therefore, wish to claim is as follows:

1. A reamer of the kind described, comprising a hollow cylinder and a shank axially extending therefrom, the cylinder having a plurality of radially disposed slots in its wall and extending parallel to the axis of the cylinder, a closure for the opposite end of the cylinder, a shaft axially disposed therein, said shaft being journalled in the end closure and being partly threaded into a bore in the shank end of the cylinder, a cone axially mounted on the shaft, a plurality of radially disposed blades, having outer edges serrated for cutting and having inner edges in a sliding abutment with the sides of the cone, a coiled spring transversely located within the body of each blade, the outer ends of the spring bearing against the inner surface of the cylinder to hold the blade in said abutment, and means to rotate the shaft to propel the cone axially, to cause the cone to force the blades outwardly against the tension of said springs.

2. A reamer of the kind described, comprising a hollow cylinder and a shank axially extending therefrom, the cylinder having a plurality of radially disposed slots in its wall and extending parallel to the axis of the cylinder, a closure for the opposite end of the cylinder, a shaft axially disposed therein, said shaft being journalled in the end closure and being partly threaded into a bore in the shank end of the cylinder, a cone axially mounted on the shaft, ball bearing means between the shaft and the inner surface of the cone abutting said shaft, a plurality of radially disposed blades, having outer edges serrated for cutting and having inner edges in a sliding abutment with the sides of the cone, a coiled spring transversely located within the body of each blade, the outer ends of the spring bearing against the inner surface of the cylinder to hold the blade in said abutment, and means to rotate the shaft to propel the cone axially, to cause the cone to force the blades outwardly against the tension of said springs.

HARRY G. VOLIS.

REFERENCES CITED

The following references are of record in the file of this patent:

UNITED STATES PATENTS

| Number | Name | Date |
|---|---|---|
| 749,202 | Klay | Jan. 12, 1904 |
| 1,484,207 | Campbell | Feb. 19, 1924 |
| 2,164,620 | Parish | July 4, 1939 |